3,154,617
METHOD OF MAKING COMPOSITE CONTAINER
Richard F. Schenk, New Market, Eli A. Zackheim, Princeton, and William R. Heffernan, Westfield, N.J., assignors to Johnson & Johnson, a corporation of New Jersey
Original application May 4, 1960, Ser. No. 26,750. Divided and this application Feb. 7, 1962, Ser. No. 171,733
6 Claims. (Cl. 264—266)

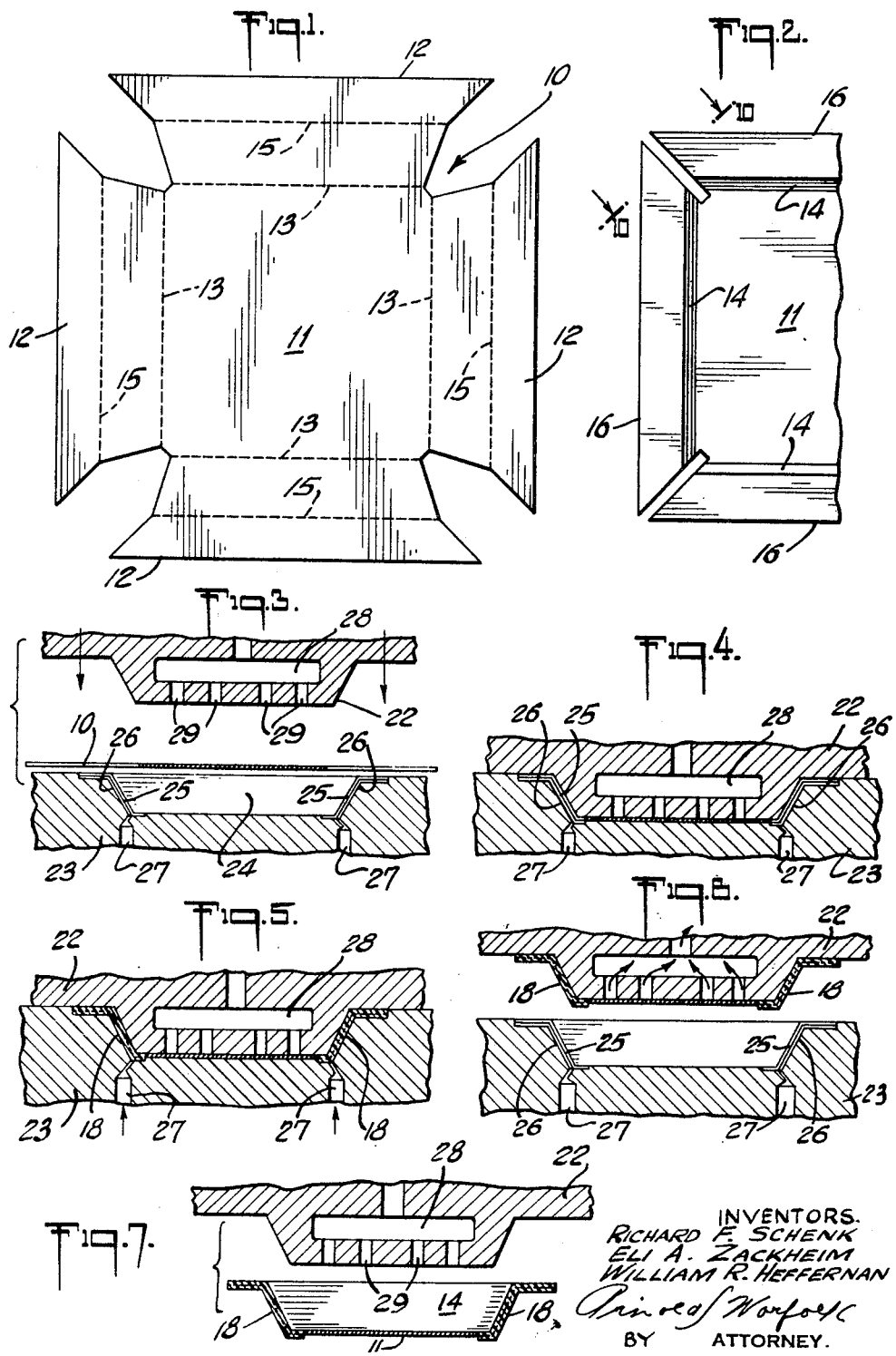

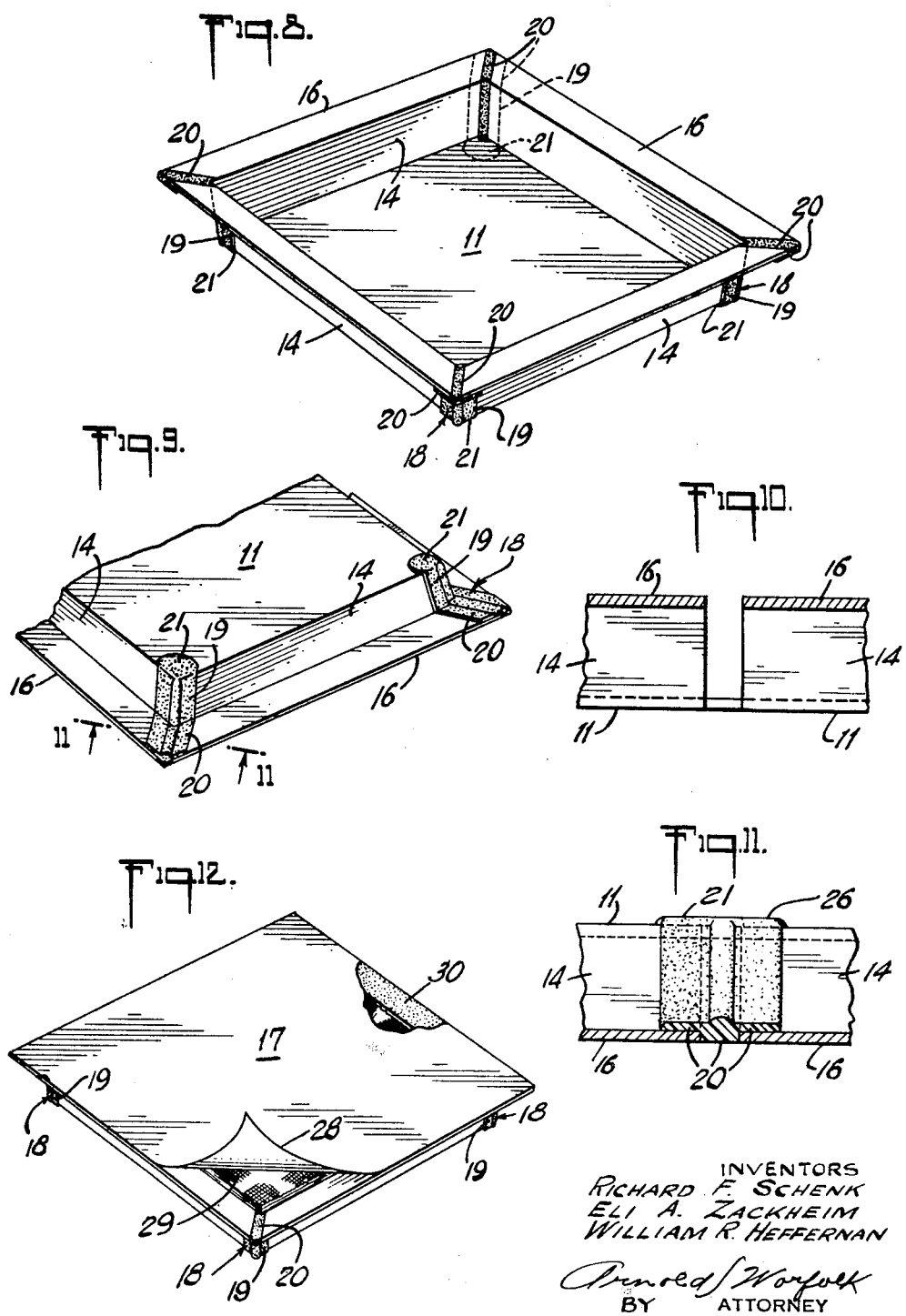

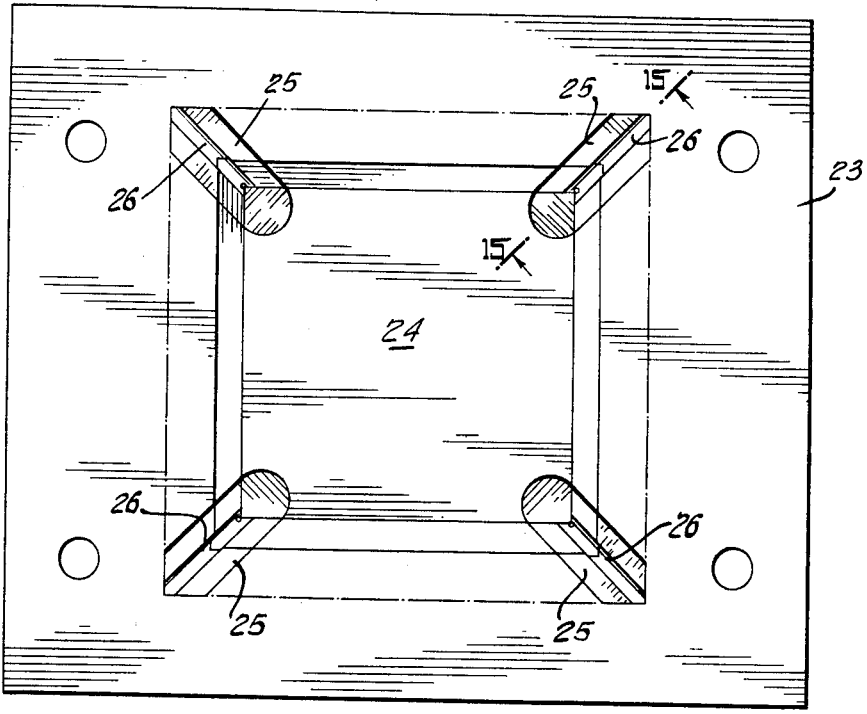
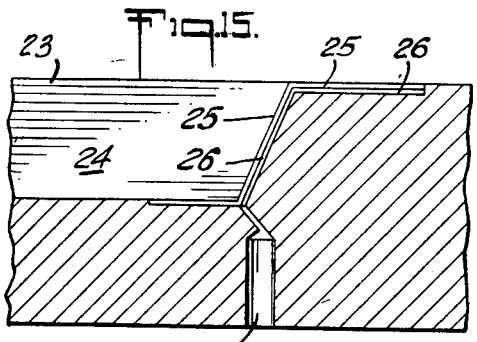
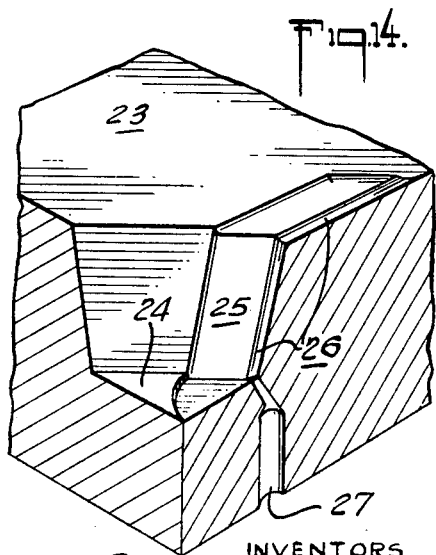
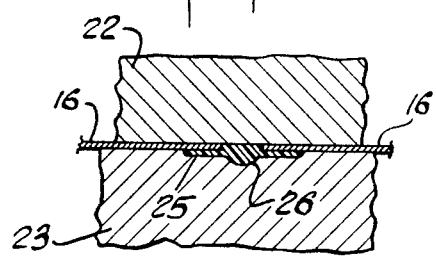

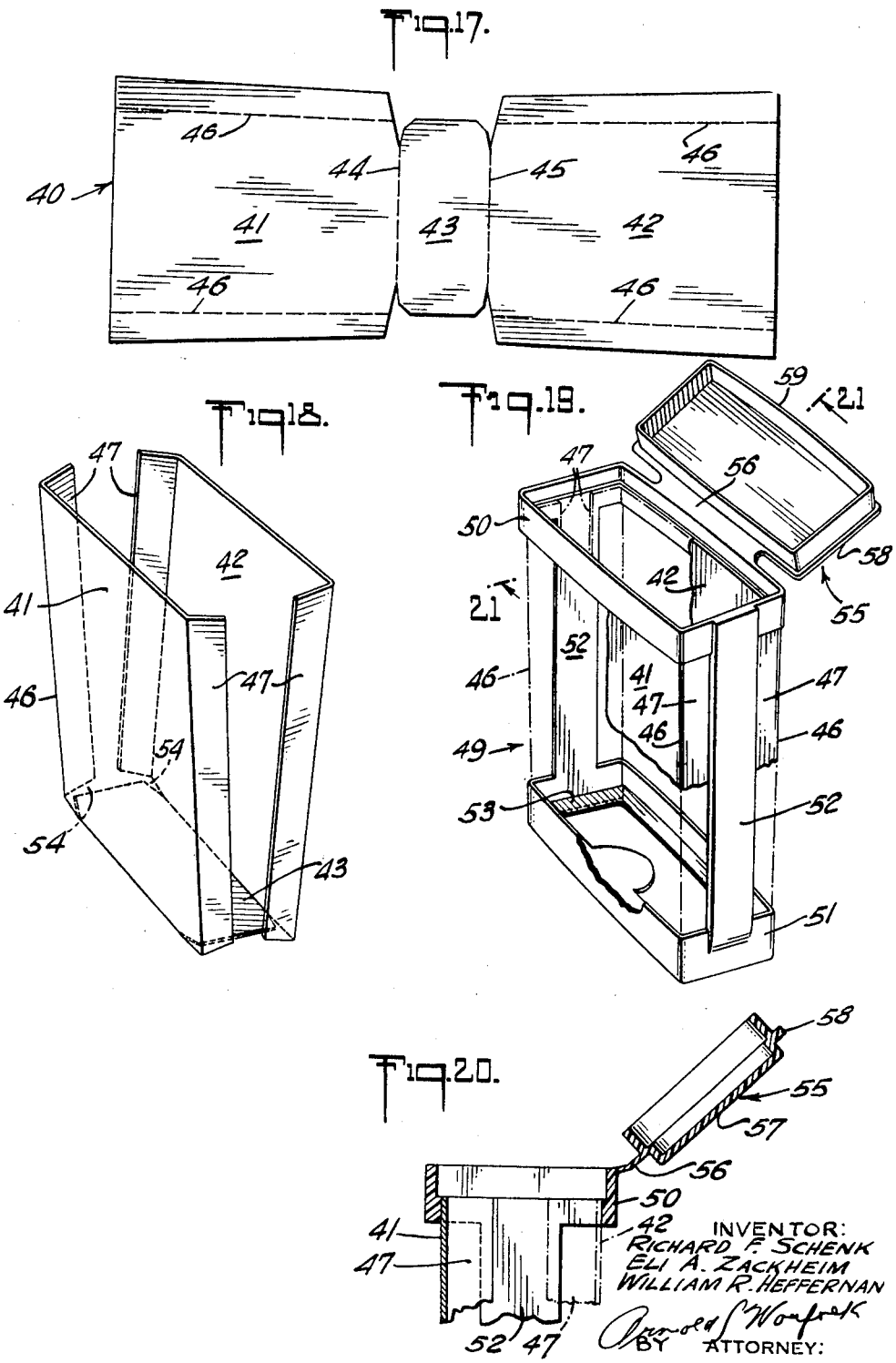

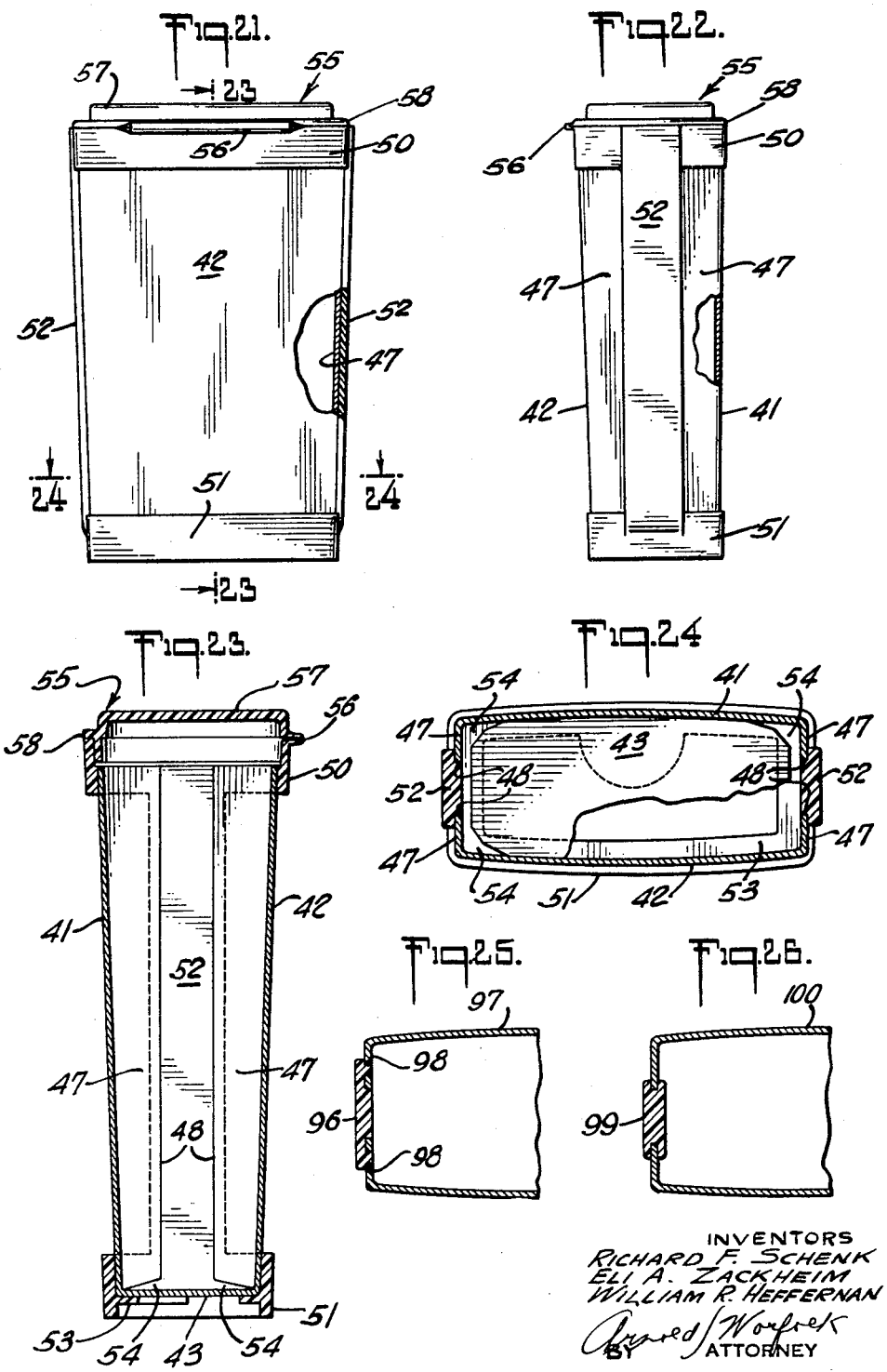

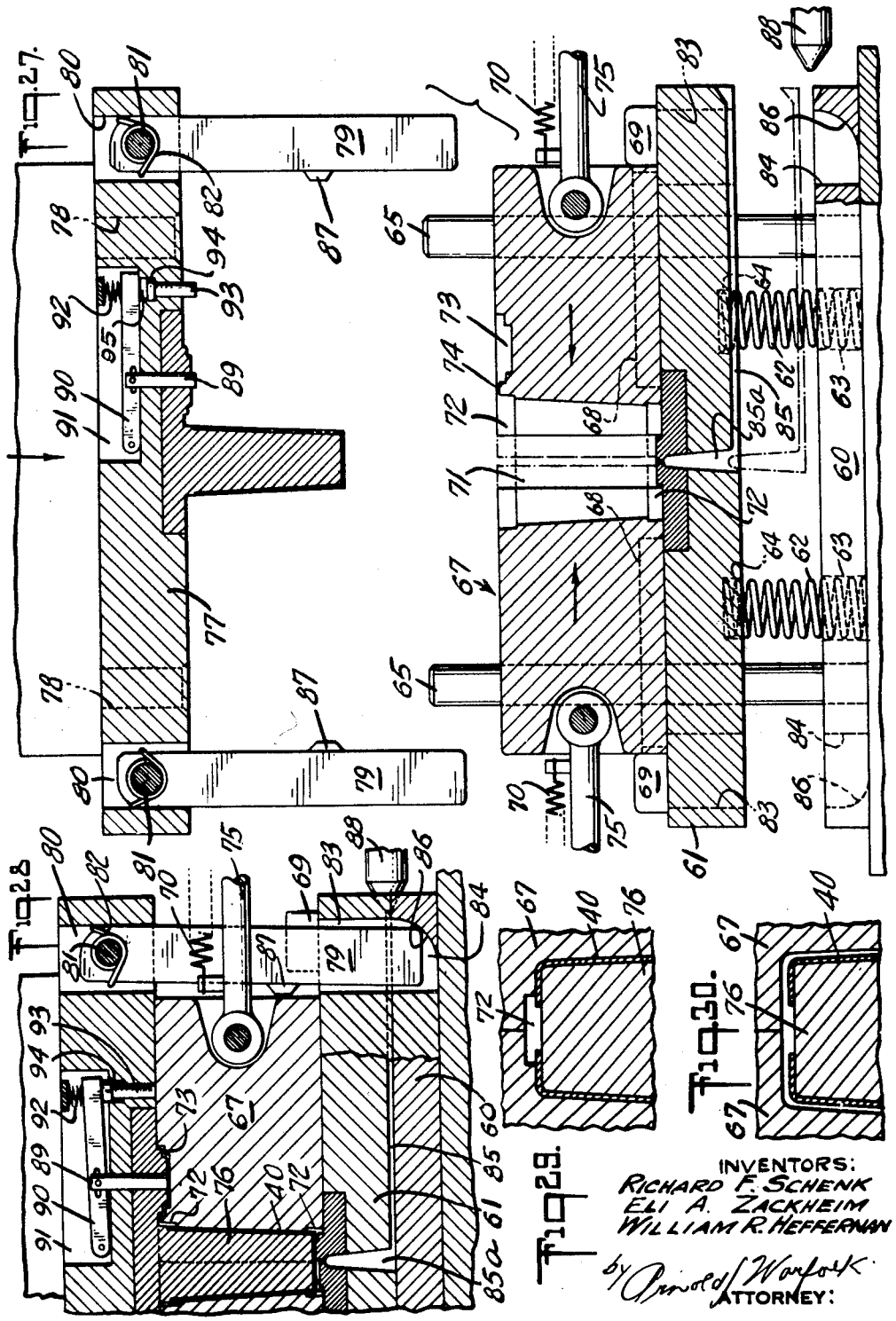

The present invention relates to a container formed of a composite of plastic and of flexible sheet material, and to a method of making it. This application is a division of co-pending application Serial No. 26,750, filed May 4, 1960, for Container and Method of Making It.

According to the present invention, a container of substantially fixed volume and form which is made from relatively cheap and preferably flexible sheet material such as paper, cardboard, foil, sheet metal and the like, has substantial strength imparted to it by plastic structural members molded in place to hold the container together and preserve its contour. The improved container may have panel members, such as sides and bottom, joined together by the molded structural members. In the molding process, plastic material may be caused to fill up the space between the edges of the panels, and to adhere to the surfaces of the panels adjacent their edges or to interlock with the panels as by entering such interstices as may be present in the panel members near the edges thereof or by the edges of the panel members entering grooves in the structural members. In this way, the molded structural members cooperate to preserve the contour of the panels and the panel members cooperate to maintain the location of the molded structural elements that hold them together. By appropriately shaping the mold cavities in the vicinity of those parts of the container that are to be strengthened or joined together by the structural elements, desired rigidity and contour in the container may be obtained.

While the improved container may partake of many forms and participate in many uses, two types thereof have been selected for illustration. One type of container is suitable for surgical sponges and the like. It requires sufficient strength and rigidity to maintain its integrity and facilitate stacking it one upon another. When sealed and sterilized it must be impervious to the entrance of bacteria or other harmful organisms that otherwise would contaminate the sterile products sealed therein, and it preferably must be relatively low in cost economically to permit discarding after opening and removal of the sterile contents.

The second type of container selected for illustration is one which heretofore has usually been made of sheet metal and with substantial depth as compared to its length and width and with a hinged cover. A tobacco tin is an example of this type of container. While sheet metal may be used in the manufacture of a container in accordance with the invention, a lighter and cheaper material such as cardboard or even heavy paper also may be economically used. The panels of such a container may be suitably formed and inserted in an appropriate die having mold cavities in the vicinity of its top edges, its side seams and its bottom edges. By injection molding a plastic material into them old cavities of such a die when the panel elements are in place, not only are the panel elements held together but the container is suitably reinforced and appropriate shape and contour given to it.

A better understanding of the invention may be had from the following description read in conjunction with the accompanying drawings, wherein:

FIG. 1 illustrates a flat blank from which a container is formed;
FIG. 2 is a partial top view of the blank after it has been folded into the form of a container but prior to molding the corners;
FIGS. 3, 4, 5, 6 and 7 illustrate different steps which may be used in making a container from the blank of FIG. 1;
FIG. 8 is a perspective view of a finished container looking at the top;
FIG. 9 is a perspective view of a portion of a finished container looking at the bottom;
FIG. 10 is a sectional view taken on line 10—10 of FIG. 2;
FIG. 11 is a sectional view taken on line 11—11 of FIG. 9;
FIG. 12 is a perspective view of the container looking at the top and showing the container equipped with a sealed cover partially removed to show the contents and an underlying adhesive seal.
FIG. 13 is a top plan view of the female die used in forming the container and in molding the structural members therein;
FIG. 14 is an enlarged sectional perspective view of a portion of one corner of the die in FIG. 13;
FIG. 15 is a sectional view taken on line 15—15 of FIG. 13;
FIG. 16 is a cross-sectional view taken across one corner of the container flange during molding of the corners.
FIG. 17 illustrates a flat blank from which another type of container may be formed;
FIG. 18 is a perspective view of the blank after folding but prior to insertion in the forming die;
FIG. 19 is a perspective view of the structural framework formed to support and impart contour to the container panels, the panels being partly broken away to show the interior of the casing;
FIG. 20 is a vertical sectional view on line 20—20 of FIG. 19;
FIG. 21 is a front elevation of the finished container;
FIG. 22 is a side elevation of the container shown in FIG. 21;
FIG. 23 is a vertical sectional view on line 23—23 of FIG. 21;
FIG. 24 is a horizontal sectional view on line 24—24 of FIG. 21;
FIGS. 25 and 26 are horizontal sectional views showing two different types of panel connecting structural members;
FIG. 27 is a vertical sectional view through a molding mechanism suitable for making the type of package illustrated in FIGS. 17 to 24 and showing the mold open;
FIG. 28 is a vertical sectional view of part of the mechanism shown in FIG. 27 but with the mold closed;
FIG. 29 is a horizontal sectional view taken through the mold cavity and about midway between the top and the bottom of the container after the mold has been closed but before plastic injection;
FIG. 30 is a partial horizontal sectional view similar to FIG. 29 but taken at a somewhat lower level.

A container suitable for surgical sponges and the method of making it are illustrated in FIGS. 1 to 16. A blank 10 is first formed out of a flat sheet of paper or similar material (FIGS. 1 and 2). Blank 10 includes a rectangular bottom portion 11, and marginal edge portions 12, extending outwardly from the bottom portion one at each of its edges. In forming a container from this blank, these extending edge portions are bent along fold lines 13 where they join the bottom portion 11, upwardly to form container sides 14, and then along fold lines 15 outwardly to form a container rim 16 to which a flexible cover 17 is secured to close the container (FIG. 12).

In the particular embodiment shown, it will be noted that in the blank 10 the angle between the ends of adjacent edge portions 12, in that part thereof which ultimately become adjacent sides 14, is somewhat less than a right angle. This gives an outward flare to the sides, after the container is formed making the container somewhat larger at its mouth than at the bottom to provide for easier removal of sponges or other contents which may be packaged therein.

The panel elements constituting the container are held together in their proper relationship by a plastic structural member 18 formed one each at the corners of the container. Each structural member includes an upright portion 19 extending from the bottom to the top of the container. The plastic enters into and fills up any space that exists between the adjacent edges of the side panels 14, and it extends from the corner edge along the side panels to which it adheres, in both directions for a distance sufficient to give some strength and contour to the container corners. The structural corner member 18 further includes a flange portion 20 at the top which likewise enters into and fills up any space that exists between the adjacent edges of intersecting rim members 16 and which likewise extends along such rim members, to which it adheres, a distance sufficient to impart strength to the rim members. This flange member 20 also serves to maintain a fixed angular relationship between those upright portions 19 of the structural member which radiate outwardly from the corner along the side elements 14. A flange 21 formed integral with the structural upright portions 19 at its lower end also helps maintain the angular relationship between the same radiating portion or legs of the structural members and, of course, it completely seals the container at this point by adhesion to the bottom.

Since the structural members are injection molded they can, without difficulty, be made in any shape as demanded by the desired contour of the container, and to any degree of flexibility or rigidity merely by appropriately varying the dimension of the structural member and the thermoplastic material used in making it.

Formation of the container is best illustrated by reference to FIGURES 3 through 7. In forming the container, a pair of co-acting male and female die members 22 and 23 respectively are used. The female die member 23, as best illustrated in FIGS. 13 and 14, is formed with a die cavity 24 which is generally the shape of the container to be formed. The die cavity is provided at its corners with mold cavities 25 into which a plastic resin mass is injected after the two die members 22 and 23 are brought together with the panel material of the container in between. The mold cavity 25 has the shape of the structural member to be molded. A channel 26 communicates with and forms part of each of the mold cavities 25, the channels in turn being connected to inlets 27 which are in turn placed in communication with an injection molding apparatus of any conventional design for forcing plastic into the mold cavities 25.

The upper male die member 22 is provided with a vacuum chamber 28 and passages 29 extending from the vacuum chamber 28 to the exterior surface of the die through which a vacuum may be established for holding a container or the blank from which it is formed, in position on the die member.

The blank 10 is placed over the female die member 23 with its base panel 11 in registry with the base of the cavity 24 in the female die member as illustrated in FIGURE 3. The male die member 22 is lowered as shown in FIGURE 4 to push the blank 10 down into the die cavity 24. As the blank is moved into the die, the marginal edge portions 12 are folded upwardly along fold lines 13 and outwardly along fold lines 15 to form the sides 14 and the flange or rim 16 of the container. In this illustrated form of the container, the blank 10 is so formed that adjacent edges at the ends of the side members do not overlap, as best illustrated in FIGURES 2 and 10. This insures that the top surface of the rim section 16 all around the finished container is flush as will be evidenced hereinafter. After the die members 22 and 23 have been brought together and the blank 10 appropriately folded thereby, a plastic molding material is injected under pressure by conventional injection molding techniques, through passageways 27 and into the mold cavities 25 at each corner of the container, completely to fill the same. Except for spaces between the walls and the rim sections of the container at the corners, at which region the mold cavity is closed by the surfaces of the male die, the mold cavity is otherwise closed by the sheet material of which the panel members are made.

The plastic material is injected into the mold cavities under substantial pressure, generally in excess of about 1000 pounds per square inch. As a result, the plastic material is forced into every available space completely to fill the mold cavities and form the molded plastic structural corner members 18. As the pressure under which the plastic is molded causes very intimate contact between it and the other container material and since the plastic material is selected to have substantial adhesive compatibility with such container material, a strong bond between the structural member and the other container material is obtained. Also, because of the manner of forming the container, the upper surface of the flange portion 20 at the top of the plastic structural member where it projects between the edges of the rim elements and the corresponding surface of the upright portion of the plastic structural member where it projects between the edges of the wall elements, are flush with the top surface of the container and with the inner surface of the wall members, respectively, as best illustrated in FIG. 10. A flexible cover 28 secured to the container flange or rim 16, as illustrated in FIG. 12, will have uniform contact throughout the top surface of the flange and thus the container will be quite devoid of any channel to the interior of the container that might permit leakage after the cover has been sealed to the container rim.

After the plastic has set either by cooling if it is a thermoplastic material or by appropriate curing if it is a heat set or a catalyzed resin material, a suction is established in the die member 22 to hold the formed container in intimate contact with it. Die member 22 is then raised with the completed container adhering thereto, as illustrated in FIG. 6. After the container is removed from the die member 23, suction in the die member 22 is disestablished thereby releasing the finished container to permit its separation therefrom.

The finished container without cover comprises the bottom 11, sides 14 and rim 16, formed from blank 10, which, if paper, has little strength and might readily be deformed in the use for which the package is normally intended. The molded plastic structural members 18, however, not only completely seal any channels that might otherwise exist between adjacent end edges of the side and rim members, but also extends from the end edges along the sides and rim members for a portion of their length, thereby to impart a fixed contour to such members in the vicinity of the structural members not only peripheral wise but also in a direction from top to bottom. It should also be noted that the rigidity of the corner structural members cooperate with the side panels and rims of the container so as in effect to make a structural form of these latter members, i.e., an angle extending all around the container and this in addition lends structural strength to what otherwise might be a fragile container.

In FIG. 12 a finished container is illustrated which has been filled with flat surgical sponges 29. After filling, the container is sealed by a paper cover, which may be cemented as by an adhesive 30 to the rim 16. The cover 28 may extend beyond the rim of the container on at least one side thereof to provide a tab that can be grasped for ready removal of the cover. After the cover has been cemented to the rim, the container with contents may then be sterilized by conventional steam or chemical sterilization.

Any of the conventional plastics used for injection molding may be employed as long as they have sufficiently high softening point if temperatures of sterilization must be withstood. Excellent containers are obtained, for example, by using papers of about 35 to 60 pound weight and by injection molding the corners from linear polyethylene.

Although containers made in the manner herein described are particularly useful for packaging sterile articles, they may be used for inexpensively packaging any item to protect it from contamination. The improved container may be completely sealed to the entry of air, as in an air or gas tight package, by forming the container and cover from a material substantially air impermeable. Such a material, for example, could be a metal foil or a resin impregnated paper. Since the improved containers are devoid of air channels at the meeting edges, a container and cover made of air impervious material is, when sealed closed, essentially air or gas tight. Such containers are particularly useful for the packaging of food or any other product where it is desirable that the container be sealed against the entry of air.

In FIGS. 17 to 30 inclusive there is illustrated a different type of container together with its method of manufacture. The container is of tall type with hinged cover quite similar in shape to those often used for pipe tobacco. Such a container is substantially rectangular in horizontal section with its width from side to side greater than its depth from front to back, and its height from top to bottom greater than its width from side to side. The improved container may be formed in part from sheet material such as cardboard, chip board or even tin plate. Indeed, the invention will have substantial utility in connection with the use of any material which in the absence of some reinforcement and in the service for which it is intended would suffer risk of being deformed. In this embodiment of the invention, a blank 40 of sheet material is died out to form two substantially rectangular sections 41 and 42 ultimately to comprise the front, rear and side paneling of the container and an intermediate section 43 of somewhat less width connected to the rectangular panels along parallel fold lines 44 and 45 and ultimately to form the base paneling of the container. The members 41 and 42 comprising the front and rear panels of the container are bent upwardly along the fold lines 44 and 45 where they interconnect with the base panel. The front panel 41 is then bent rearwardly and the rear panel 42 forwardly along fold lines 46 near and substantially parallel to the lateral edges of said front and rear panels to present opposed marginal portions 47 in fore and aft alignment at opposite sides of the blank and which, in part, will form the sides of the container. When the front and rear panels 41, 42 are bent upwardly into substantial parallelism, the opposed edges of the marginal portions may have some intermediate spacing 48 for a purpose later made clear (FIG. 24).

The various panel members 41, 42, 43, 47 are held in location and are strengthened against deformation by a framework 49 which is molded in place (FIG. 19 and FIGS. 21 to 24). In this particular embodiment the framework includes a rim 50 of plastic material at the top of the container, a rim 51 of plastic material at the bottom of the container, and two interconnecting vertical upright strips 52 located at opposite sides of the container and which are molded integrally with the rim both at the top and at the bottom. In the finished product, the front and the side wall panels telescope for a short distance into the rim members which thus will overlap along their adjacent marginal edges (FIGS. 19 and 24). The parts are bonded firmly together along these overlapping portions during the formation of the container. The strength imparting structural strips 52 at the sides extend into and fill up the space 48 between the opposed edges of the marginal portions 47 of the blank, constituting the side walls of the container, and these structural members are also formed so as to overlap marginal portions of the side panels at the front and at the rear edges of these upright structural strips. With this construction, the front and rear panels are held against any substantial deformation not only by their bonded connection with the relatively stiff rim members but also by those portions of the upright members at the sides which project into and fill up the space between the opposed edges of the side panels at the front and at the rear of the upright members.

As shown at FIG. 24, increased strength or rigidity against deformation may be imparted to the lower rim member 51 by molding to it an integral flange 53 which extends inwardly from the inner surface of the rim member for a distance sufficient for the purpose. This flange may be located just below the bottom 43 and during the process of forming the container, the plastic material will flow up into any spaces 54 that exist where the bottom of the container meets the walls so that the container is completely closed all around the bottom. It should be noted that in the container illustrated in FIGS. 17 to 24 inclusive, the front and rear wall members are bowed outwardly on a relatively large radius and this also imparts strength to the container. Thus, absent the bowed contour, if the front and rear walls of the container are pressed inwardly toward each other somewhere near the top rim, a direct force in tension is exerted tending to break the seal between the front and rear panels and their adjacent rim sections. With the bowed construction similar forces pressing the front and rear panels tend to flatten them out and thus a force in shear as well as in one in tension is required to destroy the bond at this point. This, however, is not to imply that a flat wall construction in accordance with the invention is not a desirable one but merely that the versatility in design is almost unlimited and that some constructions for some purposes may be better than others. If greater strength or rigidity against deformation is desired lower down in the vicinity of the rim, the reinforcing flange 53 to which reference has been made may be replaced by a full molded bottom which could serve either to supplement the cardboard bottom or used in lieu of a cardboard bottom in which case separate blanks for the front and rear walls of the container would be used. Provision is made for the bowed frame and rear wall panels, by having those portions of the blank which present such panels flare outwardly with the lines of fold defining the marginal portions located parallel with the lateral edges of the blank.

In this embodiment of the invention, the container is provided with a hinged lid 55 molded integrally with the upper rim member 50 and, if the hinge 56 is molded thin enough and of a material such as polypropylene, numerous flexings may be accomplished in the opening and closing of the container without rupture of the hinge. The hinged lid portion shown open in FIGS. 19 and 20 and closed in FIG. 23, has a top closing portion 57, an outwardly extending peripheral flange 58 which rests against the upper edge of the top rim member 50 when the container is closed, and a depending peripheral flange 59 extending downwardly and which is arranged to telescope within the upper rim member when the container is closed. When closed, the depending flange on the lid cooperates with the rim at the top of the container to resist lateral forces tending to deform the container and since the tendency of these elements to resist deformation is substantially augmented by the flange 59 which is bowed or arched correspondingly to the rim 50 and by the relatively rigid top plastic section 57 of the lid, the forces tending to resist deformation in the improved container are very substantial indeed.

It should be understood, of course, that while the plastic framework has a substantial amount of rigidity tending to resist deformation in the container to a substantial degree, it also has flexibility so that were the framework molded without the panel members, substantially less force would be required to displace or twist the members of the framework with respect to each other. The panel members when molded in place, however, serve by their tensility and rigidity, if present, to maintain the relative locations of the structural members of the framework, while the framework in turn preserves the contour of the panels.

A mold device designed to facilitate the manufacture of a container similar to that shown in FIGS. 17 to 24 is illustrated in FIGS. 27 to 30, comprises a fixed machine bed plate 60 and an overlying mold supporting plate 61 floating above the bed plate on vertically arranged springs 62 which seat at their lower ends in holes 63 provided for the purpose in the bed plate and at their upper ends in recesses 64 formed in the bottom of the mold supporting plate. The mold supporting plate 61 is guided for a limited movement in a vertical direction by vertical guide studs 65 fixed in the bed plate and which pass through appropriately disposed guide holes 66 in the mold supporting plate.

The mold supporting plate 61 carries a female die 67 arranged in two parts for sliding movement in a lateral direction toward and away from each other. Cooperating tongue and groove connections 68 in the bottom of the die parts and at the top of the mold supporting plate 61 guide the die sections in their lateral movement which, as will be observed, is limited in a direction away from each other by stops 69 fixed in the die supporting plate. The die parts are biased outwardly by tension springs 70 suitably anchored in a fixed part of the machine.

The female die 67 in the closed position of the part presents a mold cavity 71 which conforms to the contour of the container to be molded and this cavity, around its top and around its bottom as well as vertically along its sides, is recessed further to present molding cavities 72 for the rim sections at the top and at the bottom of the container and for the intermediate vertical structural members at the sides. The right-hand female die section is further equipped at the top with a mold cavity 73 having the outer shape of the container lid with a portion 74 for the flexible hinge.

As stated, the sections of the female die are normally retracted to full open position, but at the start of the casting cycle these sections are moved toward each other by hydraulic means (not shown) which act through connecting rods 75 pivoted at diametrically opposed regions on the sections. The female die sections are arrested in their inward movement with approximately 1/16 of an inch clearance between them, this for the purpose of avoiding risk of scuffing the sheet material of the blank as it is inserted into the die.

A container blank 40 appropriately folded as indicated in FIG. 18 is placed upon a male die member 76 which overlies the mold cavity 71 in vertical alignment with the center line thereof. The blank may be held in position on the die member 76 by suitable vacuum means which, for clarity, have not been shown. The male die member 76 is recessed into the bottom surface in a horizontal male die supporting member 77 of a molding machine which member is arranged for movement in a vertical direction to effect closure and permit opening of the mold. During a molding cycle the horizontal die supporting member 77 descends until the lower face thereof engages the top face of the female die sections 67 and during this movement, vertical guide holes 78 disposed therein receive the guide studs 65 to insure that the container blank 40 is appropriately received in the molding cavity.

The male die carrying member 76 is equipped at opposite sides with depending fingers 79 pivotally supported in slots 80 therein, each on a pin 81 extending in a fore and aft direction and biased by tension of spring 82 to swing outwardly into a substantially vertical position. Such position is determined by engagement of the outer edges of the fingers 79 with the adjacent walls of the slots in which they are respectively supported.

As the male die supporting member 76 descends, the fingers pass first through holes 83 in the female die supporting plate 61, provided merely for the sake of clearance, and when engagement of such member with the female die sections have been effected these fingers stand above and in registry with a pair of underlying recesses 84 in the machine bed plate. Continued descent of the male die supporting member is accomplished against the compression of the springs 62 supporting the female die supporting plate until the latter plate is arrested by engagement with the fixed bed plate 60. In such position, a recess 85 in the bottom surface of the female die supporting plate cooperates with the top surface of the bed plate 60 to establish a horizontal passageway communicating with a vertically disposed inlet gate 85a leading to the casting cavities of the mold. Also as the male die supporting member completes its downward stroke, the vertical fingers 79 engage at their lower ends with inwardly sloping surfaces 86 that act to swing the said fingers inwardly and by the reaction of protrusions 87 on their inner edges against adjacent outer surface portions of the female mold sections, cause the latter to complete their inward movement fully to close the mold 71 (FIG. 25).

When the mold has been closed a nozzle 88 of a molding machine is connected with the passageway leading to the mold cavity 85 and thermoplastic material injected into the mold to fill up all of the mold cavities therein including, as will be recalled, that portion 73 of the cavity at the top of the female die which forms the lid of the container. Pressures in the neighborhood of 15,000 p.s.i. may be encountered but such pressures may be more or less depending upon different factors as those skilled in the art well known.

In connection with opening the mold after the molding operation, note that there is a stripping pin 89 that passes vertically through that portion of the male die 76 that cooperates in forming the lid of the container. This pin is arranged for limited sliding movement in a vertical direction and is appropriately connected at its upper end by pin and slot connection with a horizontally disposed lever 90 about midway between its ends. This lever is disposed in a slot 91 in the male die supporting member and at one end is pivoted near the center line of the machine and at its opposite end pressed by an overlying spring 92 for a limited distance downwardly or to a point where the stripping pin projects just below the face of the male die section. Beneath the lever at the location of the overlying spring 92, there is located a pin 93 arranged for vertical movement and provided with a head 94 at its upper end disposed in an enlarged portion of a hole 95 which accommodates the shank of the pin. The head, by engagement with the base of such hole 95, limits movement of the pin 93 in a downward direction. In the normal position of the parts, the pin 89 extends down below the bottom face of the male die supporting member which, as it moves downward to engage the top face of the female die, causes the pin 93 likewise to engage said surface to swing lever 90 upwardly against the reaction of the overlying spring 92 until the stripping pin at its lower end is flush with the molding surface of the male die. When the male die carrying member ascends at the completion of the casting cycle, the lever 90 by the reaction of the spring 92 against its upper edge, forces the stripping pin 89 downwardly to strip the container lid off the male portion of the die and thereby prevent the lid of the container from being pulled away from that portion of the molded container normally remaining in the female section of the die.

Also, upon inauguration of upward movement of the male die carrying member 76, the fingers which previously had been effective in squeezing the female mold members 67 closed are lifted from the underlying cam surfaces 86 which effected their inward movement whereupon the female mold members 67 separate under the reaction of the tension springs to which reference has heretofore been made.

The female die supporting plate 61 ascends to its uppermost position as permitted by the movement of the overlying male die supporting member 76, under the influence of the compression springs 62 which support it. During this movement of the female die supporting plate, hardened plastic material present in the gate 85a and in the passageway 85 leading to the gate is broken off from the molded container and left between the machine base plate 60 and the female die supporting plate 61 from which it may readily be removed.

If all members of the structural framework of the container are interconnected, as is the case in the embodiment of the invention illustrated in FIGS. 17 to 24, one gate only to the mold cavity will suffice. If the design of the container is such that the structural members of the container are not all interconnected then more than one gate to the mold cavity will be desirable, as is well understood.

As shown in FIG. 29, the upright structural members 52 of the container are cast in cavities 72 at opposite ends of the mold and here it will be observed that portions of the cavities are overlapped by paneling whose edges are in spaced relation. The thermoplastic material will flow into the spaces between the opposed edges of the paneling as well as outside of the paneling where the thermoplastic material adheres to marginal portions of the paneling adjacent the edges thereof.

It may sometimes be desirable to use the invention in connection with molding a container whose paneling material has little adhesive affinity for the particular type of plastic material used. Then, for example as in FIG. 25, it may be desirable to augment the adhesive bonding between the plastic structural members 96 and the paneling 97 by mechanical bonding. Here marginal portions of the paneling adjacent the opposed edges of the paneling are provided longitudinally therealong with spaced holes 98 through which plastic material will flow as the container is molded so as to key the paneling into the structural member.

Again by way of example, structural members and paneling may be tongued and grooved together as by molding portions of the structural member 99, both on the inside and on the outside of the paneling 100 along its marginal edges (FIG. 26). Then, of course, a part of the mold cavity will be recessed into the male member of the container forming die and the container paneling will overlap portions of the cavities in all die sections.

The different designs that may be used in molding containers in accordance with the invention are substantially without limit. The spatial configuration of the plastic structural members may be utilized to give an artistic embossed effect and the paneling itself may be given various contours for the same purpose. Complementary telescoping formations may be used at the top and at the bottom of containers so as to facilitate shelf stacking of similar products of the same brand name. Selected panels, as for instance the bottom or the sides or both, may be cast all in plastic material either for strength or artistic effect, and the top and a wall panel for instance may be made without an intermediate structural member, and a hinged fold in the panel material itself may be used, all without departing from the spirit of the invention. The advantages possessed of cardboard, paper, sheet metal and the like insofar as printing and decorating are concerned, will reside in the improved container since the panels can be made of any of these materials as desired. The improved container possesses an economic advantage since its cost of production is far less than containers of the type it is intended to replace.

The invention is susceptible of many modifications within its spirit and accordingly is to be limited only by the scope of the appended claims.

What is claimed is:

1. The method of making a composite container of substantially fixed volume and form and possessing side and bottom sections of flexible sheet material with cooperating reinforcing plastic structural members, which method includes: bending a flat blank of flexible sheet material of given thickness and having various panel sections corresponding to said side and bottom sections, by the movement to mold closing position of male and female mold elements of given contour to locate said panel sections in the respective positions they will occupy relatively to each other in the container and with marginal portions of said given thickness near the edges thereof extending in overlapping relation with a plurality of spaced cavity portions in the mold and with at least one face of each extended portion in spaced relation with the opposed face of a mold cavity portion so at least partially to close said cavity portion and form therewith a matrix for a reinforcing plastic structural member section, said panel sections of the blank when the mold is closed having the given contour of the mold, simultaneously injecting a thermoplastic material into each matrix and into bonding engagement with the face of the extended marginal edge portion of the panel section cooperating to form said matrix, and effecting solidification of the thermoplastic material in the matrix without disruption of said bonding engagement whereby to form an integral unitary composite container of the bottom and side panel sections and said plastic structural members.

2. The method of making a composite container of substantially fixed volume and form and possessing side and bottom sections of flexible sheet material with cooperating reinforcing plastic structural members, which method includes: bending a flat blank of flexible sheet material of given thickness and having various panel sections corresponding to said side and bottom sections by the movement to mold closing position of male and female mold elements of given contour to locate said panel sections in the respective positions they will occupy relatively to each other in the container and with marginal portions of said given thickness near the edges thereof extending in overlapping relation with spaced cavity portions in the mold and with at least one face of each extended portion in spaced relation with the opposed face of a mold cavity portion so at least partially to close said cavity portion and form therewith a matrix for each reinforcing plastic structural member section including a matrix cooperating to form a rim at the top of the container; simultaneously injecting a thermoplastic material into each matrix and into each matrix and into bonding engagement with the face of the extended marginal edge portion of the panel section cooperating to form said matrix; and effecting solidification of the thermoplastic material without disruption of said bonding engagement; said mold elements and the mold cavity portions therein having size, disposition and configuration such that a reinforcing rim is formed at the peripheral top of the container determinative of the size and configuration of the container adjacent said peripheral top and which comprises thermoplastic material molded integrally with other of the reinforcing plastic structural members.

3. The method of making a composite container of substantially fixed volume and form and possessing side and bottom sections of flexible sheet material with cooperating reinforcing plastic structural members, which method includes: bending a flat blank of flexible sheet material of given thickness having various panel sections corresponding to said side and bottom sections by the movement to mold closing position of male and female mold elements of given contour, to locate the blank sections in the respective positions they will occupy relatively to each other in the container and with marginal portions of said given thickness near the edges thereof extending in overlapping relation with spaced interconnected cavity portions in the mold and with at least one face of each extended portion in spaced relation with the opposed face of a mold cavity portion so at least partially to close said cavity portions and form therewith a matrix for a unitary frame of plastic structural member sections and including a matrix portion cooperating to form a rim at the top of the container, injecting thermoplastic material into said matrix and into bonding engagement with the faces of the extended marginal edged portions of the panel sections cooperating to form said matrix, and effecting solidification of the plastic material without disruption of said bonding engagement; said mold elements and the mold cavity portions therein having size, disposition and configuration such that the unitary frame of reinforcing structural member sections is simultaneously bonded to the panel members to preserve the contour of the panel members and the spatial configuration of said structural member sections.

4. The method of making a composite container of substantially fixed volume and form and possessing side and bottom sections of flexible sheet material with cooperating reinforcing plastic structural member sections, which method includes: bending a flat blank of flexible sheet material of given thickness having various panel sections corresponding to said side and bottom sections by the movement to mold closing position of male and female mold elements of given contour to locate the blank sections in the respective positions they will occupy relatively to each other in the container and with marginal portions of said given thickness near the edges thereof extending in overlapping relation with spaced interconnected cavity portions in the mold and with at least one face of each extended portion in spaced relation with the opposed face of a mold cavity portion so at least partially to close said cavity portions and form therewith a matrix for a unitary frame of reinforcing plastic structural member sections including a matrix portion cooperating to form a rim at the top of the container; injecting thermoplastic material into said matrix and into bonding engagement with the faces of the extended marginal edge portions of the panel sections cooperating to form said matrix; and effecting solidification of the plastic material without disruption of said bonding engagement; said mold elements and the mold cavities therein having size, disposition and configuration such that a reinforcing rim is formed at the peripheral top of the container determinative of the size and configuration of the container adjacent said peripheral top and which comprises thermoplastic material molded as an element of the unitary frame.

5. The method of making a composite container of substantially fixed volume and form which includes locating flexible sheet paneling material of given thickness in a mold of given contour and in a position to span an area defined by a plurality of spaced cavity portions in said mold, said paneling material having marginal portions of said given thickness near the edges thereof extending in overlapping relation with said mold cavity portions and with at least one face of each extended portion in spaced relation with the opposed face of a cavity portion so at least partially to close the cavity portion and form a matrix therewith, conforming said paneling of flexible sheet material to said given mold contour while maintaining said extended marginal portions in overlapping relations with said cavities, simultaneously injecting a thermoplastic material into each matrix and into bonding engagement with the face of the extended marginal edge portion of the paneling material cooperating to form said matrix, and effecting solidification of the thermoplastic material in said matrix without disruption of said bonding engagement.

6. The method of making a composite container of substantially fixed volume and form which includes locating flexible sheet paneling material of given thickness in a mold of given contour, by the movement to mold closing position of male and female mold elements, and in a position to span the area between a plurality of spaced cavity portions in said mold, said paneling material having marginal portions of said given thickness near the edges thereof extending in overlapping relation with said mold cavity portions and with at least one face of each extended portion in spaced relation with the opposed face of a cavity portion so at least partially to close the cavity portion and form a matrix therewith, conforming said paneling of flexible sheet material to a contour as determined by said male and female mold elements while maintaining said extended marginal portions in overlapping relation with said cavity portions, simultaneously injecting a thermoplastic material into each matrix and into bonding engagement with the face of the extended marginal edge portion of the paneling material cooperating to form said matrix, and effecting solidification of the thermoplastic material in the matrix without disruption of said bonding engagement.

References Cited in the file of this patent
UNITED STATES PATENTS

| | | |
|---|---|---|
| 2,193,513 | Hempel et al. | Mar. 12, 1940 |
| 2,392,734 | Haberstump | Jan. 8, 1946 |

UNITED STATES PATENT OFFICE
CERTIFICATE OF CORRECTION

Patent No. 3,154,617              October 27, 1964

Richard F. Schenk et al.

It is hereby certified that error appears in the above numbered patent requiring correction and that the said Letters Patent should read as corrected below.

Column 8, line 7, after "fingers" insert -- 79 --; column 10, line 55, strike out "into each matrix and", first occurrence.

Signed and sealed this 23rd day of March 1965.

(SEAL)
Attest:

ERNEST W. SWIDER
Attesting Officer

EDWARD J. BRENNER
Commissioner of Patents